Figure 1:
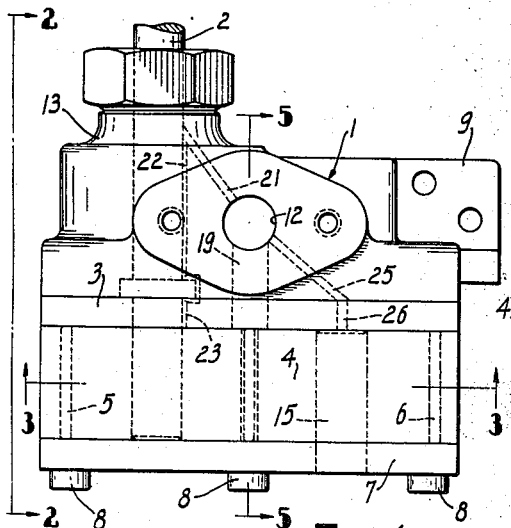

March 10, 1942.  J. P. SIMONS  2,276,107

GEAR PUMP

Filed May 9, 1939

Inventor
JOHN P. SIMONS
BY *Charles Herrström*
Attorney

Patented Mar. 10, 1942

2,276,107

UNITED STATES PATENT OFFICE 2,276,107

GEAR PUMP

John P. Simons, Lakewood, Ohio

Application May 9, 1939, Serial No. 272,626

4 Claims. (Cl. 103—126)

This invention relates to the lubrication of rotary pumps employed to provide a constant pressure flow of fluid; for example, gear pumps.

The construction of most gear pumps is such that any extraneous material used as a lubricant tends to work its way into the fluid which is being pumped. In cases where the lubricating material differs in its physical and/or chemical properties from the main body of fluid, the contamination that results is usually undesirable. In some instances the physical properties; e. g., the consistency, of the main body of fluid may be altered by the contaminating material to such an extent as to render it unfit for its intended use. On the other hand, certain lubricants affect the chemical nature of the main body of fluid, likewise destroying its usefulness for the purpose for which it is intended.

Contamination of the main body of fluid may in some cases be eliminated by using as a lubricant the material which is being passed through the pump. For instance, a pump used with fluids of low viscosity; e. g., an oil pump, may frequently be lubricated to advantage by part of the oil being pumped. In such case, because of its low viscosity, the fluid being passed through the pump can work its way into and around the surfaces to be lubricated. This principle may be employed in a great many cases where fluids of relatively low viscosity are handled, provided such fluids are otherwise capable of being used as lubricants.

An entirely different problem arises when gear pumps are employed to pump fluids of comparatively high viscosity. In such a case, the fluid being pumped cannot be depended upon to work its way into the bearings; instead, the pump must be provided with passages for conducting the lubricating materials to and from the moving parts, this in order to assure effective lubrication of the bearing surfaces. Usually, in such circumstances, the presence of pockets, dead air spaces, etc., in such passages tends to bring about a more or less static condition of part of the fluid, thereby impairing but by no means destroying the effectiveness of the lubrication.

If, however, the fluid is one that tends to coagulate, much more serious difficulties are encountered. A specific example is found in the lubrication of the pumps employed in the production of viscose artificial silk thread. Viscose coagulates even when it is allowed to stand, but because of its thermal-sensitivity it coagulates still more readily if heat is applied. Therefore, if part of the viscose is employed as a lubricant, it must be kept in motion so that neither a static condition of the fluid nor the heat of friction of the moving parts nor a combination of these two factors will cause the fluid to coagulate and bind the moving parts of the pump. Accordingly, in addition to providing passages for the lubricating medium, it becomes necessary to employ means providing a constant flow of lubricant through such passages.

The present invention provides a novel system of lubricating the moving parts of rotary pumps generally. Among other things, it provides a system of lubrication adaptable to apparatus employed in pumping coagulable substances of relatively high viscosity; e. g., viscose. In substance, the invention provides a system of passages through which part of the main body of fluid which is passed into the pump is conducted to the bearing surfaces of the pump before being returned to or commingled with the body of fluid from which it was diverted. Thus the fluid being pumped cannot become contaminated by lubricants, but is itself utilized as a lubricant without involving any waste of fluid.

For purposes of illustration, but in no sense of limitation, the invention will be described hereinafter in connection with a gear pump of the type used in the manufacture of viscose artificial silk thread.

Figure 4:
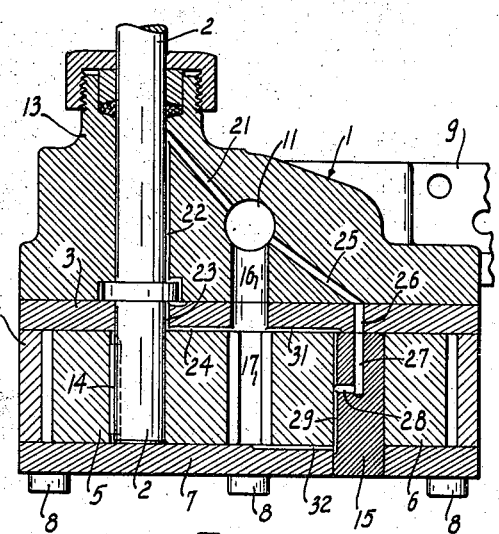
Figure 2:
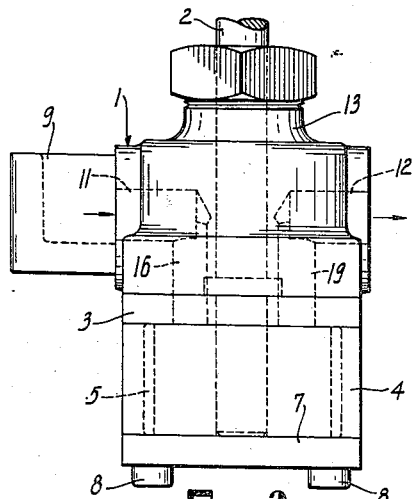
Figure 3:
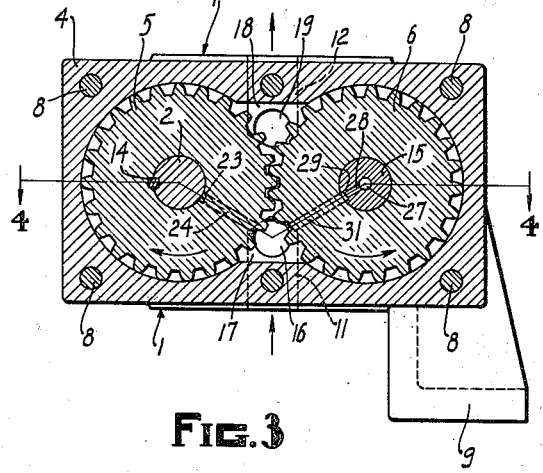
Figure 5:
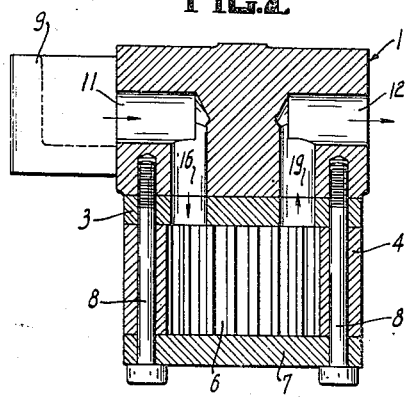

In the accompanying drawing, Figure 1 represents a plan of a pump embodying the principles of the present invention. Figure 2 represents an end elevation of the pump from line 2—2 of Figure 1. Figure 3 shows a sectional elevation from line 3—3 of Figure 1. Figure 4 shows a sectional plan from line 4—4 of Figure 3. Figure 5 represents a cross section from line 5—5 of Figure 1. In the drawing, like reference characters refer to like parts throughout.

The pump illustrated as embodying the invention is made up of a support block 1 through which passes a rotary shaft 2; an intermediate plate 3 which fits against the face of support block 1; a casing 4 embodying a pair of intermeshing gears 5 and 6, which casing fits against the opposite side of intermediate plate 3; and a cover plate 7 which fits against the opposite side of casing 4. The adjacent faces of support block 1, intermediate plate 3, casing 4 and cover plate 7 are machined to provide fluid-tight joints when the pump is assembled. Bolts 8, which pass through cover plate 7, casing 4 and intermediate plate 3, are threaded into support block 1 to maintain the parts in assembled relationship, after which the pump as a whole is appropriately mounted by means of a bracket 9 formed integrally with support block 1.

In the embodiment of the invention illustrated in the drawing, shaft 2, driven from a suitable power source, is rotatably carried by support block 1 in a boss portion 13 formed therein. Shaft 2 extends through intermediate plate 3 into casing 4. Driving gear 5 is fixed to shaft 2, key 14 serving to maintain the parts in driving relationship. Meshing with driving gear 5 is an idler gear 6 mounted for free rotation about a partially hollowed stub shaft 15 which is tightly fitted in cover plate 7 and passes through a suitable bore in idler gear 6. Preferably, but by no means necessarily, the free end of stub shaft 15 abuts against the face of intermediate plate 3 adjacent casing 4.

The fluid to be pumped is introduced into the interior of the pump through a suitable inlet passage 11 formed in the under portion of support block 1 and is passed out of the pump through a similar outlet passage 12 in the upper portion of support block 1. An inlet chamber 17 is provided in the casing 4 on one side of the point of mesh of the gears 5 and 6 and an outlet chamber 18 is provided in the casing on the opposite side of the point of mesh of said gears. As will appear, the pump as a whole, although involving the features of novelty hereinafter to be described, operates on the conventional principle with respect to the path of travel of the main body of fluid being pumped therethrough.

More specifically, an inlet conduit 16 which communicates with inlet passage 11 passes through intermediate plate 3 to inlet chamber 17 formed on the intake side of casing 4. The fluid so admitted to casing 4 is carried from inlet chamber 17 to the outlet chamber 18 on the opposite side of the casing in the spaces between the gear teeth. On the outlet side of casing 4, the fluid passes out of the spaces between the gear teeth and into outlet chamber 18. Outlet chamber 18 communicates in turn with an outlet conduit 19 which communicates with outlet passage 12 formed in support block 1.

A slightly lower pressure prevails in inlet chamber 17 than in inlet passage 11 and inlet conduit 16. This occurs by virtue of the fact that the gears 5 and 6 constantly remove the fluid from the inlet chamber 17 to the outlet chamber 18 while the fluid is being supplied to inlet passage 11 by some external means as, for example, a pipe under superatmospheric pressure. In spite of the lower pressure which obtains in inlet chamber 17, the fluid forced into outlet chamber 18 cannot escape back into inlet chamber 17, there being no communicating passages between said inlet and outlet chambers, since gears 5 and 6 fit so closely in casing 4 as effectively to prevent any escape of the fluid around the periphery of the gears, whether between the gear teeth and the casing or between the faces of the gears and the intermediate or cover plate.

In order that suitable means may be provided for lubricating the various bearing surfaces as contemplated by this invention, the pump contains a first by-pass system including duct 21 and channels 22, 23 and 24. Duct 21 leads obliquely from inlet passage 11 to a bore in the boss 13 in which shaft 2 is mounted. A channel 22 in said bore in boss 13 extends from duct 21 adjacent to and longitudinally of shaft 2 disposed therein and provides for the passage of part of the main body of fluid therethrough. A channel 23 similar to and, in fact, a continuation of channel 22 is formed in intermediate plate 3 adjacent shaft 2 and communicates with another channel 24 which is also a continuation of the aforementioned channels 24 in the face of intermediate plate 3 adjacent one face of gear 5. Channel 24 lubricates the face of gear 5 which contacts intermediate plate 3. In order that the fluid thus used may be returned to the main body of fluid from which it was diverted, channel 24 terminates in inlet chamber 17, where, as stated, a relatively low pressure prevails.

Inasmuch as gear 6 rotates about stationary stub shaft 15, lubrication of both faces of gear 6 and the surface of shaft 15 is also desirable. Therefore, the pump also contains a second by-pass system including ducts 25, 26 and 27, radial port 28 and channels 29, 30 and 31. Duct 25 leads obliquely from inlet passage 11 through support block 1 to intermediate plate 3. A duct 26 formed in intermediate plate 3 is substantially a continuation of and communicates with duct 25, terminating at the face of intermediate plate 3 adjacent stub shaft 15. At the point where the unsupported end of stub shaft 15 abuts against intermediate plate 3, the opening of duct 27 formed in stub shaft 15 coincides with the opening of duct 26 at the face of intermediate plate 3 and thereby constitutes a continuation of duct 26. A radial port 28 connects duct 27 of stub shaft 15 with a longitudinal channel 29 on the external surface thereof. At each end of longitudinal channel 29, channels 31 and 32 formed in the faces of intermediate plate 3 and cover plate 7 adjacent gear 6 communicate with inlet chamber 17.

In operation, the main body of fluid passes to the pump by way of inlet passage 11. The major portion of the main body of fluid passes through passage 16 to inlet chamber 17, while two comparatively small portions thereof are diverted from inlet passage 11 to provide lubrication of the various bearing surfaces in the pump. One of said portions of the main body of fluid passes from inlet passage 11 by way of said first by-pass system through duct 21 to channel 22 in boss portion 13, thereby providing lubrication for shaft 2 while passing through channel 22 to channel 23 in intermediate plate 3. Channel 24, also formed in intermediate plate 3 conducts this portion of the fluid along the surface of intermediate plate 3 contacted by one face of gear 5, to inlet chamber 17 where it is commingled with the main body of fluid.

The other diverted portion of the main body of fluid passes from inlet passage 11 by way of said second by-pass system through duct 25 in support block 1 to duct 26 in intermediate plate 3 to the point where the hollowed duct 27 of stub shaft 15 communicates with duct 26. This portion of the fluid passes from duct 26 to duct 27 through radial port 28 to longitudinally extending channel 29 formed on the periphery of stub shaft 15. The fluid then passes through channel 29 to channels 31 and 32, providing lubrication for both faces of gear 6 and the surface of stub shaft 15 as the gear rotates thereabout. As part of the fluid from channel 29 passes through channel 31 it serves to lubricate the surface of intermediate plate 3 contacted by one face of gear 6. At the same time, the part of the fluid passing from channel 29 through channel 32 lubricates the surface of cover plate 7 in contact with the other face of gear 6. The fluid conducted through channels 31 and 32 passes into inlet chamber 17 where it likewise commingles with the main body of fluid from which it was originally diverted.

Thus both diverted portions of fluid are commingled with the main body of fluid before any of the fluid is carried from inlet chamber 17 into outlet chamber 18.

In the illustrated embodiment of the invention, a pressure differential exists between the inlet chamber 17 and the inlet passage 11, the differential obviously being greater as the distance from the inlet chamber increases. Such pressure differential exists because of the removal of fluid from the inlet chamber and the flowing resistance of the fluid which replaces such removed fluid. According to the present invention, passages are provided to conduct the fluid being pumped from a point of higher relative pressure through the parts to be lubricated to a point of lower relative pressure, so that such pressure differential produces a flow of the fluid being pumped for lubricating purposes.

The system described constitutes a particularly efficient system of lubricating gear pumps, especially gear pumps of the type illustrated. The utilization of the hollowed portion of the stub shaft as a lubricating channel enables the system to function to particular advantage. By means of this feature of the invention, all static spaces are eliminated, lubricant being delivered in sufficient quantity and with sufficient movement to prevent any coagulation of the fluid being pumped therethrough. Further, the system provided by the invention precludes the possibility of contamination of the main body of fluid by the lubricant, inasmuch as the lubricant comprises the material being passed through the main body of the pump.

It is not to be inferred that the invention cannot be applied to forms of pumps other than that illustrated. Nor is it intended that the scope of the invention should be limited to the apparatus shown in the drawing. Various modifications of the illustrated embodiment of the invention may be made without departing from the spirit of the invention. It is intended that the patent shall cover, by suitable expression in the appended claims, whatever features of patentable novelty reside in the invention.

What is claimed is:

1. A rotary pump comprising two intermeshing fluid-impelling gears; an enclosure in which said gears fit closely including surfaces in contact with the faces of said gears; an inlet passage in said enclosure through which fluid to be pumped is supplied to said fluid-impelling gears; an outlet passage in said enclosure through which said fluid passes from said pump; and a fluid by-pass system in said enclosure including means operative to conduct continuously a portion of the incoming fluid from a point in said inlet passage remote from said gears, at which point the pressure of the fluid to be pumped is greater than that at the intake side of the zone of engagement of the gears, to the surfaces in contact with both faces of at least one of said gears and to return the by-passed fluid to the incoming fluid at a point spaced nearer the zone of engagement of said gears than said first-mentioned point at least by an amount such that the pressure differential between said points is sufficient to assist flow of fluid through said by-pass system to the surfaces contacted by the faces of said gears and back to the incoming fluid.

2. A rotary pump comprising a driving gear; an idler gear meshing with said driving gear; an enclosure in which said gears fit closely including a fluid inlet passage and a fluid outlet passage; supporting means in said enclosure about which said idler gear rotates; and a fluid by-pass system including means operative to conduct continuously a portion of the incoming fluid from a point remote from said gears, at which point the pressure of the fluid to be pumped is greater than that at the inlet side of the zone of engagement of the gears, to said supporting means and to return the by-passed portion of the fluid to the incoming fluid at a point in proximity to the zone of engagement of said gears, the point remote from the zone of engagement of said gears being spaced from the point in proximity thereto so that the pressure differential between said points is sufficient to assist flow of fluid from said remote point to said supporting means, thence from said supporting means for lubrication of said supporting means.

3. A rotary pump comprising a driving gear; an idler gear having a central bore, said idler gear meshing with said driving gear; an enclosure in which said gears fit closely including surfaces in contact with the faces of said gears; a fluid inlet passage leading to said enclosure on one side of the zone of engagement of said gears; a fluid outlet passage leading from said enclosure on the opposite side of the zone of engagement of said gears; supporting means about which said idler gear rotates in said enclosure, said means passing through the bore in said idler gear; and a fluid by-pass system including lubricating channels adjacent the surfaces contacted by the faces and bore of said idler gear operative to conduct a portion of the main body of fluid from said inlet passage at a point remote from the zone of engagement of said gears, at which point the pressure of the fluid to be pumped is greater than at the inlet side of the zone of engagement of the gears, to the faces and bore of said idler gear and to return said portion of fluid to the main body thereof at a point less remote from said zone of engagement of said gears than the point at which it was taken from the main body, the space between such points being such that the pressure differential therebetween is sufficient to assist flow of fluid through said lubricating channels from said remote point toward the zone of engagement of said gears.

4. A rotary pump comprising a driving gear; an idler gear having a central bore, said idler gear meshing with said driving gear; an enclosure in which said gears fit closely including surfaces in contact with the faces and the bore of said idler gear, an inlet passage and an outlet passage; supporting means in said enclosure about which said idler gear rotates, said means passing through the bore in said idler gear; and a fluid by-pass system including lubricating channels disposed adjacent both faces of said idler gear and a lubricating channel disposed on the surface of said supporting means, said by-pass system including means operative to lubricate the faces and bore of said idler gear by conducting a portion of the incoming fluid from said inlet passage at a point remote from the zone of engagement of said gears, through said lubricating channels to a point less remote from the zone of engagement of said gears than said first-mentioned point, the distance between said points being such that the pressure differential in the inlet passage is sufficient to assist flow of the fluid toward the zone of engagement of said gears from said remote point in said inlet passage, through the by-pass system to the faces and bore of said idler gear and back to said incoming fluid.

JOHN P. SIMONS.